(12) United States Patent
Girsig et al.

(10) Patent No.: US 8,726,336 B2
(45) Date of Patent: May 13, 2014

(54) AUTHORIZATIONS FOR ANALYTICAL REPORTS

(75) Inventors: Stefan Girsig, Heidelberg (DE); Stefan Biedenstein, Bad Schoenborn (DE); Karl-Peter Nos, Nussloch (DE); Juergen Alfred Seyfried, Walldorf (DE); Martin Osterloh, Leimen (DE)

(73) Assignee: SAP AG, Walldorf (DE)

( * ) Notice: Subject to any disclaimer, the term of this patent is extended or adjusted under 35 U.S.C. 154(b) by 317 days.

(21) Appl. No.: 12/980,551

(22) Filed: Dec. 29, 2010

(65) Prior Publication Data

US 2012/0174180 A1 Jul. 5, 2012

(51) Int. Cl.
*G06F 17/00* (2006.01)

(52) U.S. Cl.
USPC .................................................... 726/1

(58) Field of Classification Search
USPC ............................................................ 726/1
See application file for complete search history.

(56) References Cited

U.S. PATENT DOCUMENTS

| 7,650,644 | B2 * | 1/2010 | Cheng et al. | 726/27 |
| 2005/0044396 | A1 * | 2/2005 | Vogel et al. | 713/200 |
| 2010/0153432 | A1 * | 6/2010 | Pfeifer et al. | 707/769 |
| 2012/0030256 | A1 * | 2/2012 | Pfeifer et al. | 707/810 |

* cited by examiner

*Primary Examiner* — Krista Zele
*Assistant Examiner* — Esther Benoit
(74) *Attorney, Agent, or Firm* — Buckley, Maschoff & Talwalkar LLC

(57) ABSTRACT

A system may include reception of a request from a user to start a report associated with a node of a business object object model, where the node of the business object object model is associated with an access control list associating instances of the node with at least one access context restriction, determination of a first access context restriction associated with the user, retrieval of the at least one instance of the node based on the first access context restriction and on the access control list associated with the node, and presentation of an instance of the report to the user, the instance of the report populated with the at least one instance.

20 Claims, 11 Drawing Sheets

AUTHORIZATIONS FOR ANALYTICAL REPORTS

FIELD

Some embodiments relate to analytical reports provided by a business process platform. More specifically, some embodiments relate to systems to manage and utilize user authorizations with respect to analytical reports.

BACKGROUND

An application platform may implement metadata models to support different business solutions. Metadata models may include generic models of a business object, a floorplan (i.e., a user interface layout), user interface text, a process component, and a message type, among others. A business object, for example, is a software model representing real-world items used during the transaction of business. An instance of a business object metadata model may comprise a SalesOrder object model or an Organization object model. Instances of these object models, in turn, represent specific data (e.g., SalesOrder 4711, ACME corporation).

An instance of a business object metadata model (e.g., a SalesOrder object model or, more generically, a business object object model) may specify business logic and/or data having any suitable structure. The structure may be determined based on the requirements of a business scenario in which the instance is to be deployed. A business application for a particular business scenario may require many business object object models, where the structure of each has been determined based on the requirements of the particular business scenario.

The data stored by an application platform is typically accessed according to one of two primary modalities. The first, which may be referred to as an operational modality, involves accessing and modifying the data during the day-to-day course of business. The operational modality may include, for example, reviewing and updating inventory, inputting sales figures, issuing paychecks based on salary and attendance data, etc.

An analytical modality, on the other hand, generally consists of strategic analysis of business data. Activities of the analytical modality may include comparison of profit margins by location, product and/or year, sales by brand, etc. Of course some activities may be arguably classified as belonging to either the analytical modality or the operational modality.

A software solution may provide data queries, user interfaces and reports for presenting the data underlying business object object models. These queries, interfaces and reports are developed by the solution provider based on knowledge of the structure and semantics of the business object object models. Customers and partners may customize or develop similar queries, interfaces and reports, based also on the business object object models.

A developer may create a logical view of stored data based on business objects representing the stored data. A user may then access the logical view to view the stored data. Due to various business concerns (e.g., security, confidentiality, privacy), it is often necessary to restrict a user's access to all or a portion of a logical view.

Some current systems allow a developer to define access control lists for specific business object nodes. An access control list (ACL) specifies the instances of a business object node which belong to a particular access group, from an authorization point of view. U.S. patent application Ser. No. 12/647,755, entitled "Business Object Node Access Management For Search Services In A Service-Oriented Architecture" describes systems for leverage access control lists to restrict logical views and free-defined queries. However, systems are desired to leverage node-level restrictions within the analytical modality.

DETAILED DESCRIPTION

Figure 1:
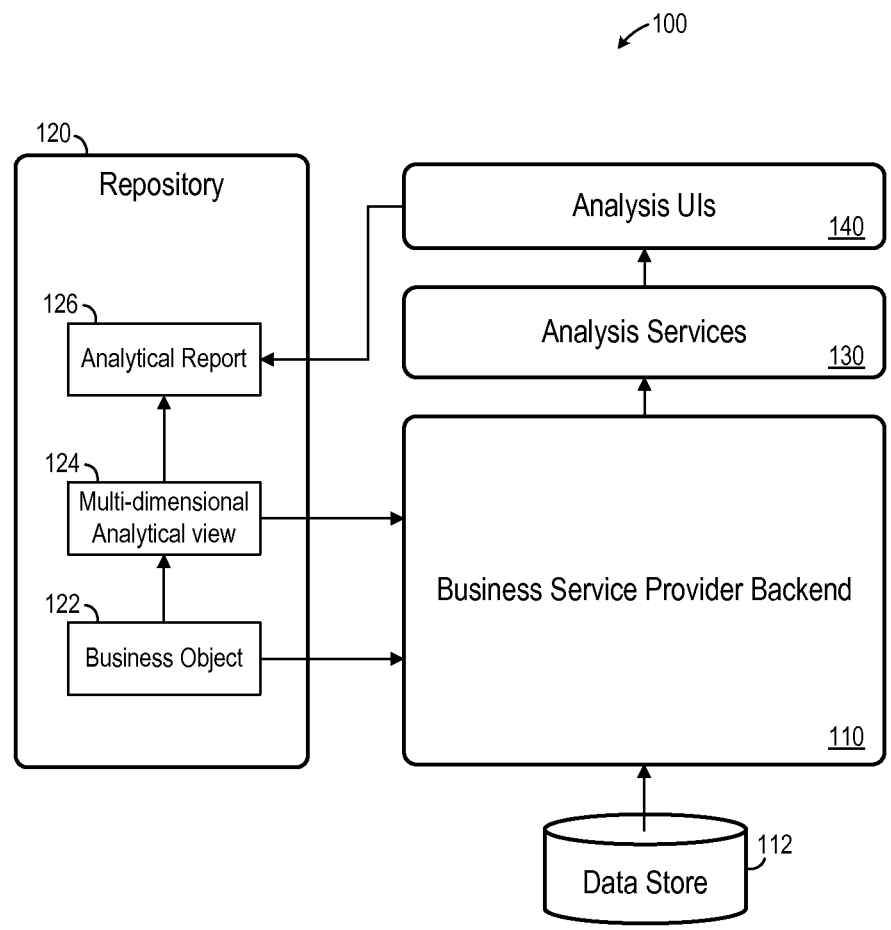
FIG. 1 is a block diagram of a system according to some embodiments.

FIG. 1 is a block diagram of system 100 according to some embodiments. FIG. 1 represents a logical architecture for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Moreover, each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

System 100 includes business service provider backend 110 for providing business services to consumers (not shown) of system 100. For example, business service provider backend 110 might store customer information into and retrieve customer information from physical tables of data store 112.

The data stored in data store 112 may be received from disparate hardware and software systems, some of which are not interoperational with one another. The systems may comprise a back-end data environment employed in a business or industrial context. The data may be pushed to data store 112 and/or provided in response to queries received therefrom.

Data store 112 may comprise a relational database, a multi-dimensional database, an eXtendable Markup Language (XML) document, or any other structured data storage system. The physical tables of data store 112 may be distributed among several relational databases, dimensional databases, and/or other data sources. To provide economies of scale, data store 112 may include data of more than one customer. Business service provider backend 110 includes mechanisms to ensure that a client accesses only the data that the client is authorized to access. Moreover, the data of data store 112 may be indexed and/or selectively replicated in an index to allow fast retrieval thereof.

The structures of and relationships between the physical database tables may be complex, and business object object models (referred to henceforth as "business objects") may be used to shield developers and end-users from these complexities. A business object may comprise, for example, a software model including nodes to encapsulate related data and methods. As described above, a business object may be associated with a business entity, such as a customer, partner, sales order, product, store, time, etc., represented in the data of a data source. Each instance of a business object may represent a particular instance of the entity represented by the business object. An instance of a SALES_ORDER business object may, for example, provide a mapping to the underlying tables storing data associated with a particular sales order.

Repository 120 includes metadata of various metadata models. These metadata models include metaobjects and instances of the metaobjects, referred to herein as object models or objects. The metaobjects and object models are defined by metadata of repository 120.

As mentioned above, the metaobjects may include generic models of a BI view, a floorplan, a business object, a user interface text, a process component, and a message type, but embodiments are not limited thereto. The metaobjects and object models may be embodied in any type of data structure, including but not limited to eXtensible Markup Language files. As in the conventional storage of object instance data, the metadata defining the specific metaobjects and object models may be stored in database tables and/or any other suitable format.

Each metaobject of repository 120 may comprise an instance of a same meta-metadata model (or meta-metaobject). The meta-metaobject may consist of nodes, composite associations, associations, elements structure and attribute properties. Development of specific business object metaobjects, specific floorplan metaobjects, etc. may therefore proceed using the same development technologies. Moreover, access and lifecycle issues of the various specific metaobjects may be managed using similar (or identical) mechanisms.

Business object 122 is an object model, or class. The metadata of business object 122 therefore provides information regarding the structure and attributes of the data of instances of business object 122. Accordingly, backend 110 uses the metadata to access corresponding data of data store 112. One or more nodes of business object 122 may be associated with an access control list. An access control list specifies instances of its associated business object node to which a user is restricted with respect to a particular access context. As will be described below, some embodiments may operate to populate an instance of analytical report 126 based on such an access control list, and based on the access context of a user who has requested the instance.

Analysis services 130 include any business services that are or become known. Examples include application programming interfaces (APIs) to access transient metadata, master data, transactional data and hierarchies. Analysis user interfaces (UIs) 140 may access business service provider backend 110 via analysis services 130. Analysis UIs 140 may include, for example, work centers, dashboards, spreadsheet applications, proprietary portals, etc.

Repository 120 also includes metadata of one or more multi-dimensional analytical view object models (MDAVs), which themselves are instances of an MDAV metadata model such as described in commonly-assigned, co-pending U.S. application Ser. No. 12/847,409, entitled "Common Modeling Of Data Access And Provisioning For Search, Query, Reporting And/Or Analytics", the contents of which are incorporated herein by reference. Generally, a multi-dimensional analytical view describes a view on a business object. As described in U.S. application Ser. No. 12/847,409, a query definition object (not shown) may define a query on a business object, and a multi-dimensional analytical view may define the results of the query as Key Figures or Characteristics. Moreover, the multi-dimensional analytical view may define rules which are used to calculate Key Figures and to define restrictions which will be used at runtime to set predefined filter parameters.

Metadata of analytical report 126 may provide analysis UIs 140 with a visual presentation of data underlying MDAV 124 and business object 122. The ability to associate analytical report 126 with MDAV 124 may facilitate the incorporation of semantically-rich information within analytical report 126. For example, analytical report 126 may simply refer to Key Figures which are calculated according to MDAV 124, without having to define a query for particular data of business object 122 or a calculation of the Key Figures based on that data.

According to some embodiments, an MDAV may be associated with more than one business object and a business object may be associated with more than one MDAV. In some embodiments, an MDAV may be associated with more than one analytical report.

Figure 2:
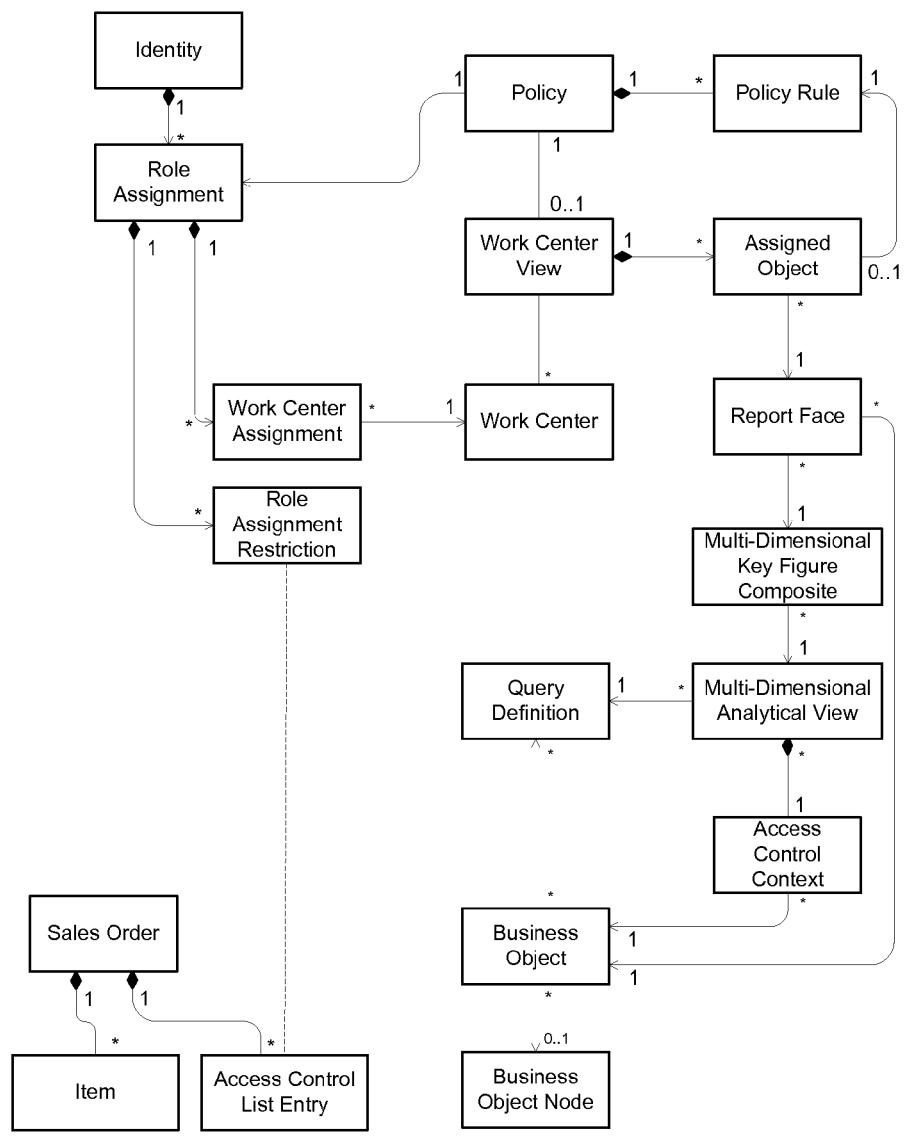
FIG. 2 is a logical data model according to some embodiments.

FIG. 2 illustrates data model 200 according to some embodiments. Data model 200 allows association of a user's identity to a role, and to assign the role to one or more work centers. Each work center includes one or more work center views, to which one or more analytical reports (e.g., each consisting of a report face and a multi-dimensional key figure composite) can be assigned. As described above, a report is based on an MDAV which in turn is based on a query definition. The query definition references one or more business objects or, more specifically, one or more business object nodes.

Data model 200 includes additional entities to provide report start and instance authorizations according to some embodiments. For example, the illustrated Sales Order object is not only associated with an item as expected, but also with any number of ACL entries. Each ACL entry represents one assignment of a resource instance to an access group. Access groups are runtime entities specified by a role assignment restrictions, representing groups of resource (e.g., node) instances for a specific access context. The entries may therefore specify, for each of one or more access contexts, one or more particular instances of a node of the Sales Order object.

For purposes of the present description, the term "access context" will refer to a type of context that may be used for authorization purposes. Examples include Company, Project Leader, Site, etc. A specific context access context will refer to a specific value/instance of the respective business object's ACL. For example, a user may be associated with access context "Company" with respect to the business object instance "Acme, Inc".

Generally, node access management allows any operation on any given business object data if and only if the union of all policies that are active in the system allow the operation. This is typically the case if the user accessing the data is assigned to a role whose policy allows the operation.

Policies contain rules, which specify conditions regarding the subject (i.e., user), operation and/or resource (i.e., business object) involved in a request, and a desired authorization decision (i.e., grant or deny) for cases where all conditions of the rule are fulfilled. A runtime authorization decision for a given request is made based on the union of all rules of all policies in the system whose conditions are all fulfilled for this request. If no rule matches the request, the implicit default rule is to deny access. If multiple rules match the request, deny rules take precedence over grant rules.

Figure 3:
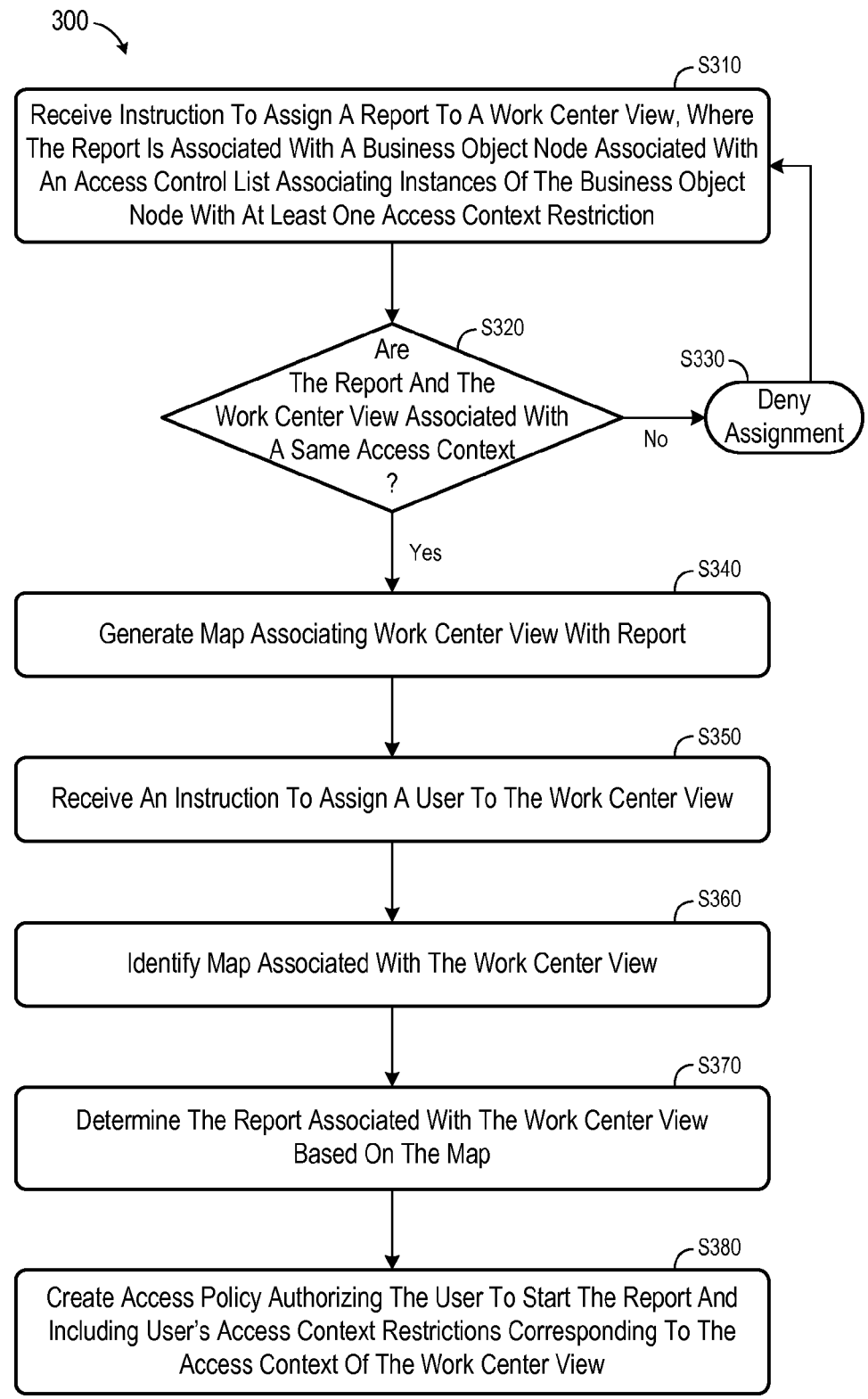
FIG. 3 is a flow diagram of a process according to some embodiments.

FIG. 3 is a flow diagram of process 300 according to some embodiments. System 100 may execute process 300 as will be described below, but embodiments are not limited thereto. In this regard, all processes described herein may be executed by any combination of hardware and/or software. The processes may be embodied in program code stored on a tangible medium and executable by a computer to provide the functions described herein.

Initially, at S310, an instruction is received to assign a report to a work center view. The report is associated with a business object node, which in turn is associated with an ACL. As described above, the ACL associates instances of the business object node with at least one access context restriction. The ACL may be provided by a view object model associated with the business object node. The view object model may comprise a Fast Search Infrastructure view, whose transient form is illustrated as a Query Definition entity in data model 200.

A work center is a collection of portal pages tailored for one job function (e.g., all portal pages required by a person performing the job of a seller). A role is a group of work centers that can be assigned to a user (work centers can't be assigned to users directly). In some embodiments, each work center is assigned to a role with the same name by default (i.e., the default is a 1:1 relationship between work centers and roles). For example, there may be one work center "Seller" and one role "Seller", which is assigned exactly to the work center "Seller".

The report is based on an MDAV according to some embodiments. The MDAV is associated with an access context, which is inherited by the report. Similarly, the work center view is associated with a default access context. Accordingly, at S320, it is determined whether the report and the work center view are associated with a same access context. If not, the assignment is denied at S330.

Figure 4:
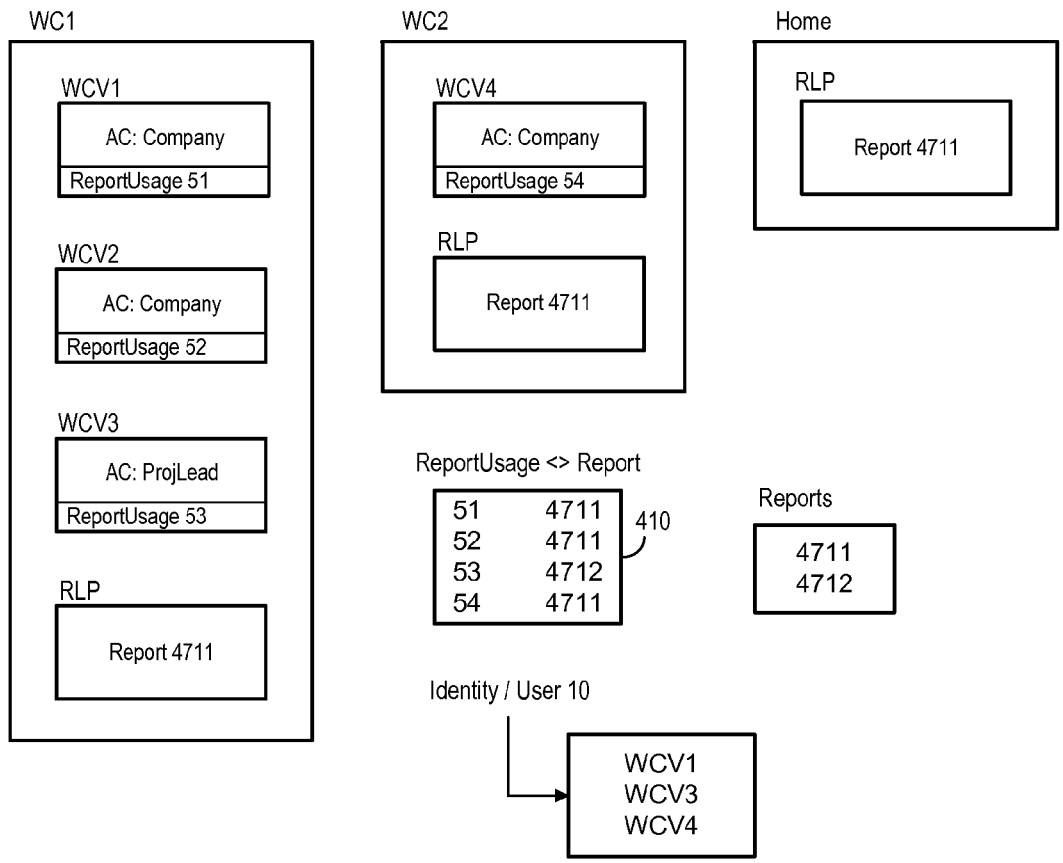
FIG. 4 is a block diagram illustrating an example according to some embodiments.

Flow proceeds to S340 if the report and the work center view are associated with the same access context. A map is generated at S340 to associate the work center view with the report. FIG. 4 is a block diagram of a system to describe an example of S340 according to some embodiments.

Specifically, FIG. 4 shows mock-ups of Work Center 1 and Work Center 2 as might be presented to a user. Work Center 1 includes Work Center Views 1 through 3 and Work Center 2 includes Work Center View 4. Each of Work Center Views 1 through 4 includes a ReportUsage identifier. Report Usage map 410 maps each ReportUsage identifier to a report using an identifier of the report. As shown, Work Center View 3 is not mapped to report 4711 because its access context differs from that of report 4711 (i.e., Company). Each Work Center View may include more than one ReportUsage identifier to associate the Work Center View with more than one report.

After S340, an instruction may be received at S350 to assign a user to the Work Center View. Accordingly, at S360, the map generated at S340 is identified and, at S370, the report associated with the Work Center View is determined based on the map. For example, if an instruction is received to assign User 10 to Work Center View 4, report 4711 is determined at S370 based on Report Usage map 410. More than one report may be determined at S370 if the Work Center View includes more than one ReportUsage identifier.

Next, at S380, an access policy is created authorizing the user to start the report and including the user's restrictions corresponding to the access context of the work center view. Continuing with the FIG. 4 example, a policy is created giving User 10 "start" authorization with respect to report 4711. Moreover, due to the access context Company of Work Center 4 and of report 4711, the policy restricts the user to his business object instances (e.g., Acme, Inc.) corresponding to the access context Company.

Figure 5:
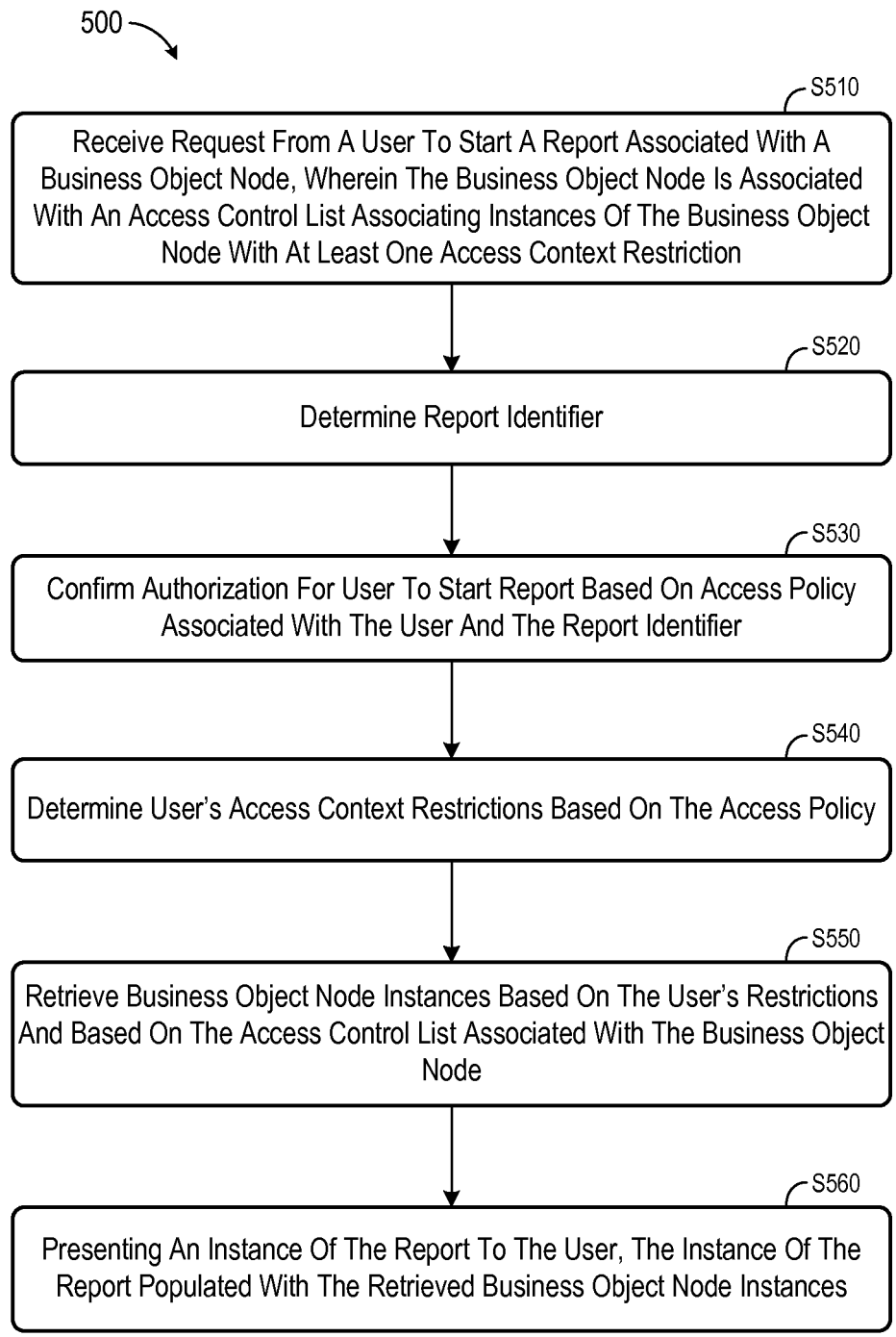
FIG. 5 is a flow diagram of a process according to some embodiments.

FIG. 5 is a flow diagram of process 500 according to some embodiments. Process 500 may utilize the policy created by process 300 to provide a report to a user based on business object node-level restrictions.

Initially, at S510, a request is received from a user to start a report associated with a business object node. As mentioned above, the business object node is associated with an ACL associating instances of the business object node with at least one access context restriction. An identifier of the report is determined at S520.

Figure 6:
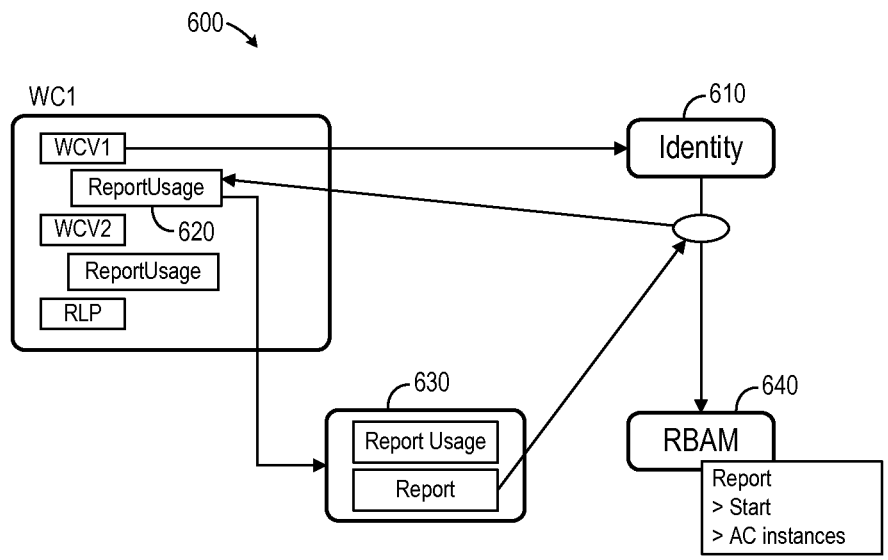
FIG. 6 is a block diagram illustrating operation of a system according to some embodiments.

FIG. 6 is a block diagram of system 600 according to some embodiments. System 600 includes components to perform a portion of process 500. For example, identity module 610 may receive the request at S510 from Work Center View 1 and determine ReportUsage identifier 620 associated with Work Center View 1. As described with respect to FIG. 3, ReportUsage identifier 620 may be used to determine a report identifier from Report Usage 630.

Using the report identifier, authorization for the user to start the report is confirmed at S530. The confirmation is based on the access policy associated with the user and the report identifier, which may have been generated as described with respect to process 300. Role-based access management module (RBAM) 640 may manage the access policy according to some embodiments and as described in previously-mentioned U.S. patent application Ser. No. 12/647,755.

Next, at S540, the user's access context is determined based on the access policy. Appropriate business object node instances are retrieved at S550 based on the user's access context and based on the ACL associated with the business object node.

Figure 7:
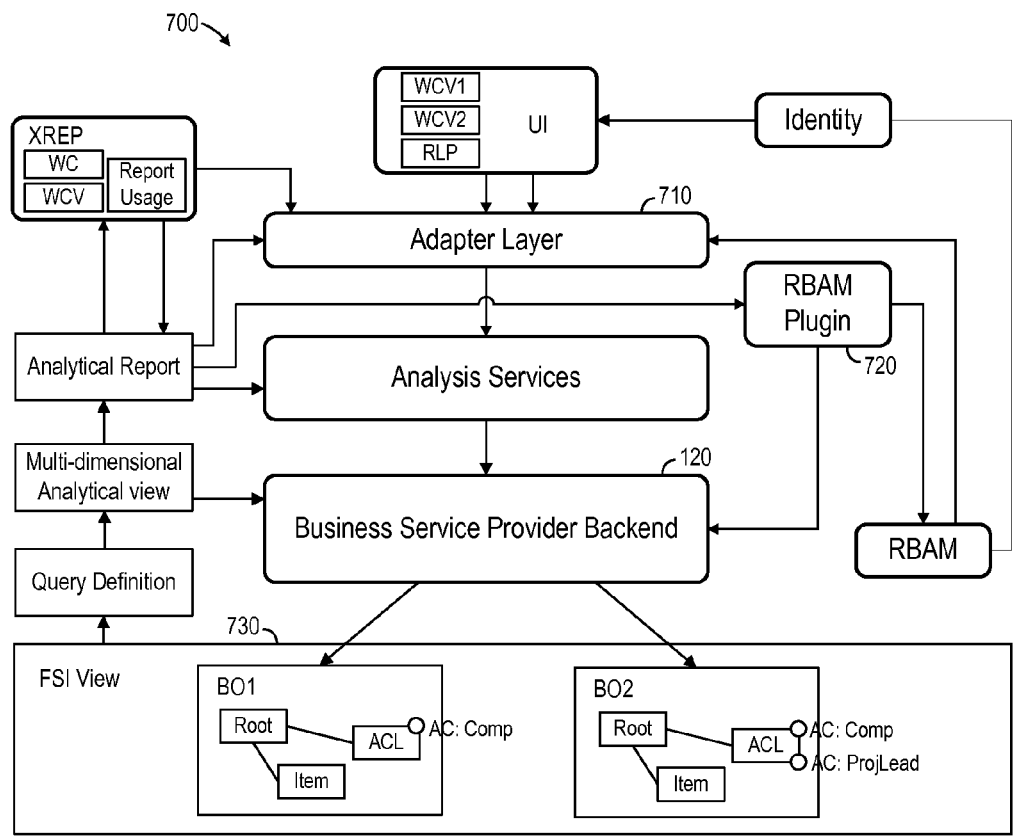
FIG. 7 is a block diagram of a system according to some embodiments.

FIG. 7 provides a more detailed block diagram for describing S550 according to some embodiments. Most of the elements of system 700 have been described herein, with the exception of adapter layer 710 and RBAM plug-in 720. In this regard, adapter layer 710 may confirm the start authorization at S530, RBAM plug-in 720 may retrieve the user's access context from RBAM module 620 at S540.

RBAM module 620 passes the restrictions to provider 120 to generate a filter condition on FSI view 730 in order to retrieve instances of business objects BO1 and BO2 based on the user's access context. Two business objects are shown to illustrate that a report may be based on more than one business object, in which case a developer must decide which ACL (AC: Comp of BO1 or AC: Comp of BO2) should control the authorization.

Finally, at S560, an instance of the report is presented to the user. The instance is populated with the business object node instances retrieved at S550.

Figure 8:
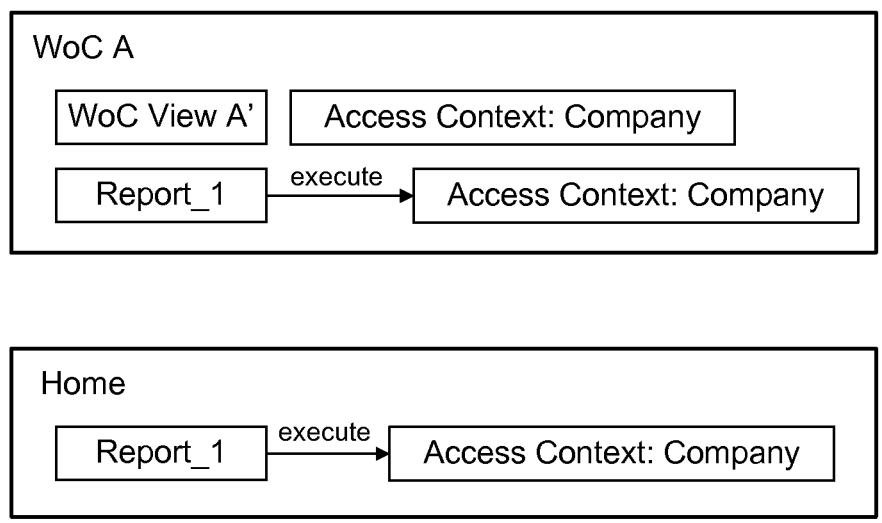
FIG. 8 is a user interface mockup of a work center according to some embodiments.
Figure 9:
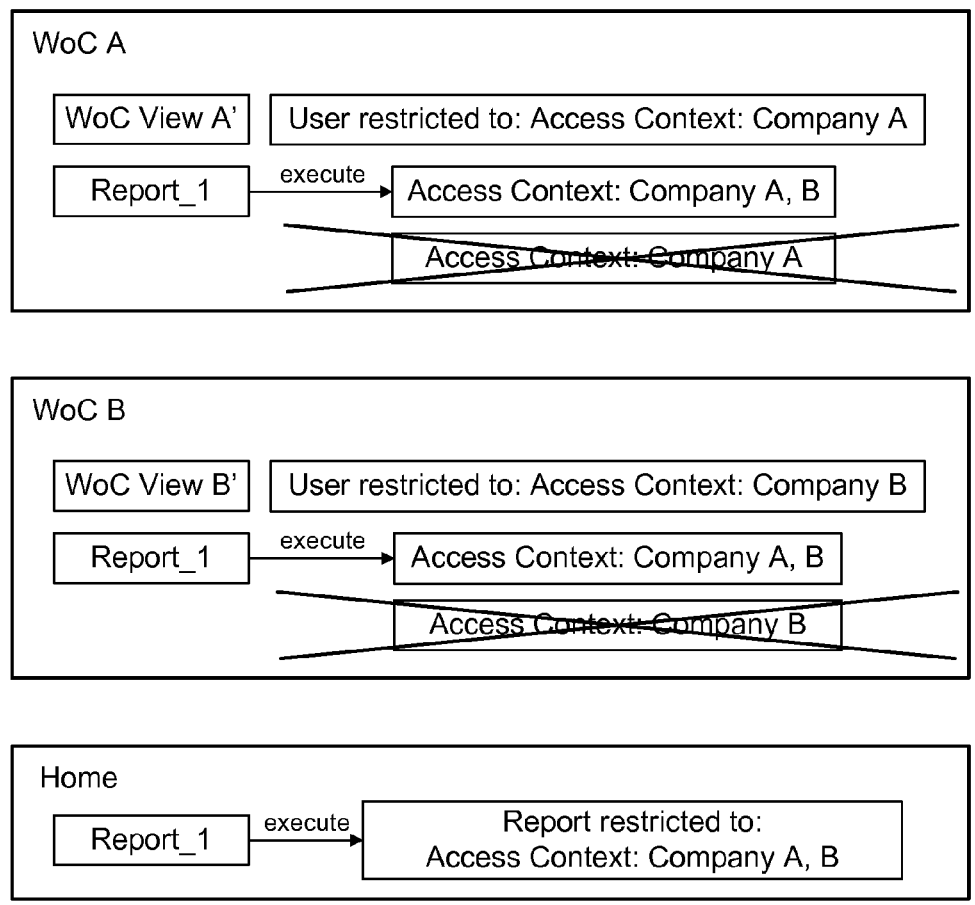
FIG. 9 is a user interface mockup of a work center according to some embodiments.
Figure 10:
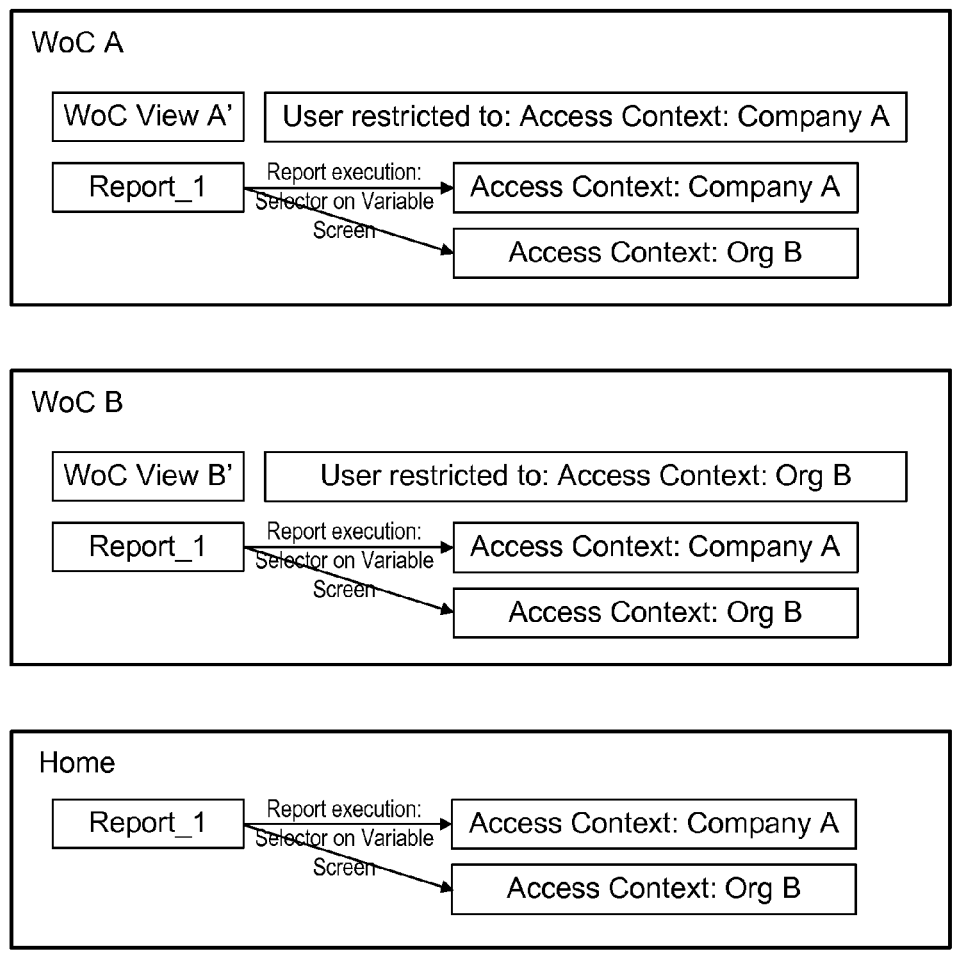
FIG. 10 is a user interface mockup of a work center according to some embodiments.

FIGS. 8 through 10 illustrate three scenarios for explaining relationships between work center views, access contexts, reports and access context restrictions according to some embodiments. FIG. 8 illustrates a simple view in which a user is assigned to Work Center View A' of Work Center A. Work Center View A' is associated with Report_1, and both are associated with the Company access context. The user is associated with access context restriction "A" (i.e., Company A). Therefore, if the user starts Report_1 while in Work Center View A' or in his Home View, the report will be populated with instances corresponding to Company A.

According to FIG. 9, the user is assigned to Work Center Views A' and B', each of which is associated with access context Company. The user is also associated with two access context restrictions (i.e., A and B). However, the user is restricted to one of the access contexts in each view. In either view, the user will see instances matching Company A and Company B (i.e., a superset of instances).

FIG. 10 also illustrates a scenario in which the user is assigned to Work Center Views A' and B', each of which is associated with access context Company. However, Report_1 is associated with access contexts Company and Org. Therefore, in Work Center View A', the user will see instances matching Company A and, in Work Center View B', the user will see instances matching Org B. As shown, the user may be presented with a selector allowing selection of either access context of Report_1.

According to some embodiments, an MDAV may be associated with more than one access code. If a report based on this MDAV is assigned to a work center views having different access codes, the user may be required to pick one access code based on which the restriction is performed. For example, a report may show the revenues of projects within companies. The MDAV of the report can use Project or Company as an access code. The report can be assigned to a Project Management work center and a Financial Accounting work center. If a project manager with accounting responsibilities opens the report, he will be asked to indicate the role for which the data should be restricted (i.e., restricted to data of his companies or of his projects).

Figure 11:
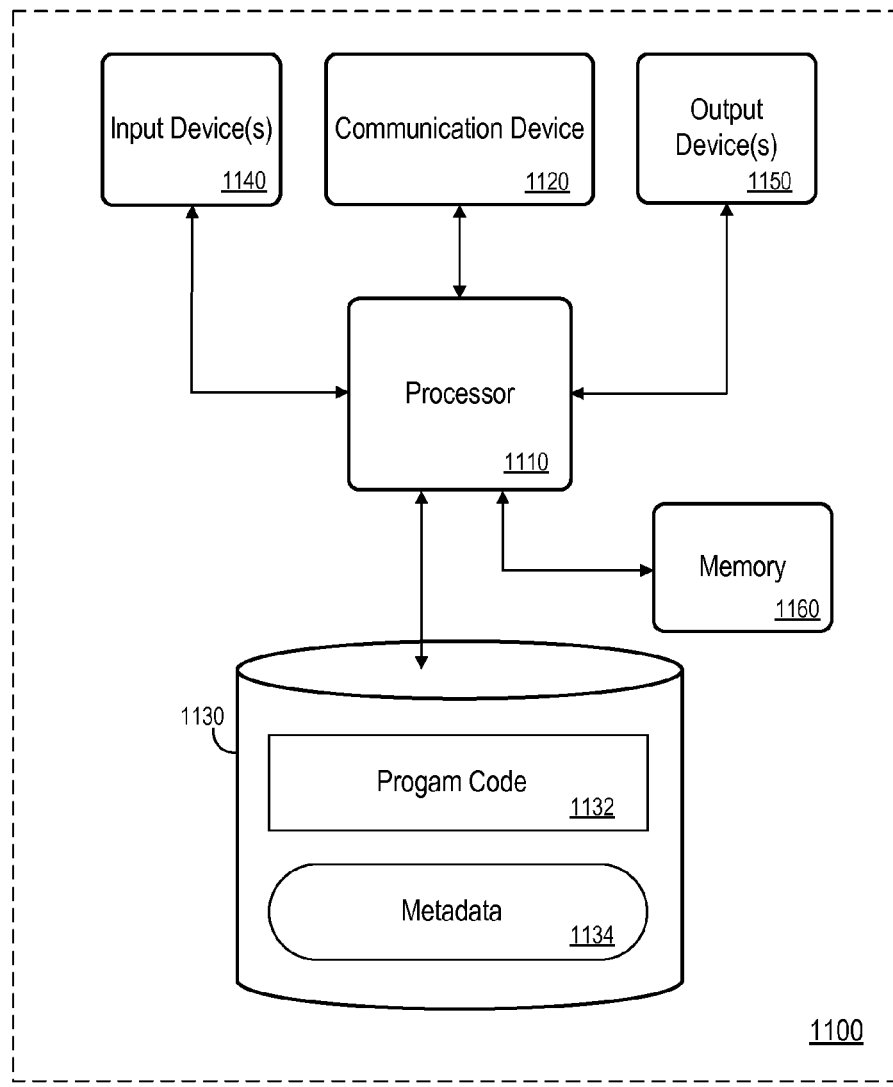
FIG. 11 is a block diagram of a computing device according to some embodiments.

FIG. 11 is a block diagram of apparatus 1100 according to some embodiments. Apparatus 1100 may comprise a general-purpose computing apparatus and may execute program code to perform any of the functions described herein. Apparatus 1100 may comprise an implementation of one or more elements of systems 100, 600 and/or 700. Apparatus 1100 may include other unshown elements according to some embodiments.

Apparatus 1100 includes processor 1110 operatively coupled to communication device 1120, data storage device 1130, one or more input devices 1140, one or more output devices 1150 and memory 1160. Communication device 1120 may facilitate communication with external devices, such as an external design tool. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM).

Program code 1132 of data storage device 1130 may be executable by processor 1110 to provide functions described herein, including but not limited to processes 300 and/or 500. Embodiments are not limited to execution of these functions by a single apparatus. Metadata 1134 may include metadata of metaobjects and objects as described herein, including ACLs associated with business object nodes. Data storage device 1130 may also store data and other program code for providing additional functionality and/or which are necessary for operation thereof, such as device drivers, operating system files, etc.

The embodiments described herein are solely for the purpose of illustration. Those in the art will recognize other embodiments may be practiced with modifications and alterations limited only by the claims.

What is claimed is:

1. A method implemented by a computing system in response to execution of program instructions by a processor of the computing system, comprising:
receiving a request from a user to start a report associated with a node of a business object object model, where the node of the business object object model is associated with an access control list associating instances of the node of the business object object model with at least one access context restriction;
determining a user access context restriction associated with the user;
retrieving at least one instance of the node of the business object object model based on the user access context restriction and on the access control list associated with the node of the business object object model;
providing an instance of the report to the user for display, the instance of the report populated with the at least one instance of the node of the business object object model;
determining that the report and a work center view are associated with a same access context; and
creating an access policy authorizing the user to start the report and including the user access context restriction, the user access context restriction corresponding to the access context of the work center view, wherein the user access context restriction is determined based on the access policy.

2. The method according to claim 1, wherein the report references a node of a multi-dimensional analytical view object model, the multi-dimensional analytical view object references a node of a view object model, and the view object model references the node of the business object object model.

3. The method according to claim 2, where the view object model comprises the access control list.

4. The method according to claim 1, further comprising:
confirming an authorization for the user to start the report based on an access policy associated with the user and the report,
wherein the user access context restriction is determined based on the access policy.

5. The method according to claim 1, further comprising:
receiving an instruction to assign the report to the work center view; and in response to the determination that the report and the work center view are associated with the same access context, generating a map associating the work center view with the report.

6. The method according to claim 5, further comprising:
receive an instruction to assign the user to the work center view;
identifying the map associated with the work center view; and
determining the report associated with the work center view based on the map.

7. The method according to claim 6, further comprising:
confirming an authorization for the user to start the report based on the access policy.

8. A non-transitory computer-readable storage medium storing processor-executable program instructions, the program instructions executable by a device to:
receive a request from a user to start a report associated with a node of a business object object model, where the node of the business object object model is associated with an access control list associating instances of the node of the business object object model with at least one access context restriction;
determine a user access context restriction associated with the user;
retrieve at least one instance of the node of the business object object model based on the user access context restriction and on the access control list associated with the node;
provide an instance of the report to the user for display, the instance of the report populated with the at least one instance;
determine that the report and a work center view are associated with a same access context; and
create an access policy authorizing the user to start the report and including the user access context restriction, the user access context restriction corresponding to the access context of the work center view, wherein the user access context restriction is determined based on the access policy.

9. The medium according to claim 8, wherein the report references a node of a multi-dimensional analytical view object model, the multi-dimensional analytical view object references a node of a view object model, and the view object model references the node of the business object object model.

10. The medium according to claim 9, where the view object model comprises the access control list.

11. The medium according to claim 8, the program instructions further executable by a device to:
confirm an authorization for the user to start the report based on an access policy associated with the user and the report,
wherein the user access context restriction is determined based on the access policy.

12. The medium according to claim 8, the program instructions further executable by a device to:
receive an instruction to assign the report to the work center view; and
in response to the determination that the report and the work center view are associated with the same access context, generate a map associating the work center view with the report.

13. The medium according to claim 12, the program instructions further executable by a device to:
receive an instruction to assign the user to the work center view;
identify the map associated with the work center view; and
determine the report associated with the work center view based on the map.

14. The medium according to claim 13, the program instructions further executable by a device to:
confirm an authorization for the user to start the report based on the access policy.

15. A system comprising:
a computing device comprising:
a memory system storing processor-executable program instructions; and
a processor to execute the processor-executable program instructions in order to cause the computing device to:
receive a request from a user to start a report associated with a node of a business object object model, where the node of the business object object model is associated with an access control list associating instances of the node of the business object object model with at least one access context restriction;
determine a user access context restriction associated with the user;
retrieve at least one instance of the node of the business object object model based on the user access context restriction and on the access control list associated with the node of the business object object model;
provide an instance of the report to the user for display the instance of the report populated with the at least one instance;
determine that the report and a work center view are associated with a same access context; and
create an access policy authorizing the user to start the report and including the user access context restriction, the user access context restriction corresponding to the access context of the work center view, wherein the restriction of the user is determined based on the access policy.

16. The system according to claim 15, wherein the report references a node of a multi-dimensional analytical view object model, the multi-dimensional analytical view object references a node of a view object model, and the view object model references the node of the business object object model.

17. The system according to claim 16, where the view object model comprises the access control list.

18. The system according to claim 15, the processor further to execute the processor-executable program instructions in order to cause the computing device to:
confirm an authorization for the user to start the report based on an access policy associated with the user and the report,
wherein the user access context restriction is determined based on the access policy.

19. The system according to claim 15, the processor further to execute the processor-executable program instructions in order to cause the computing device to:
receive an instruction to assign the report to the work center view; and
in response to the determination that the report and the work center view are associated with the same access context, generate a map associating the work center view with the report.

20. The system according to claim 19, the processor further to execute the processor-executable program instructions in order to cause the computing device to:
receive an instruction to assign the user to the work center view;
identify the map associated with the work center view; and determine the report associated with the work center view based on the map.

* * * * *